March 31, 1936.  F. S. CARVER  2,035,863
MACHINE FOR FINISHING CHOCOLATE AND THE LIKE
Filed May 27, 1930  3 Sheets-Sheet 1

INVENTOR
Fred S. Carver
BY
Dyke and Schaines
ATTORNEYS

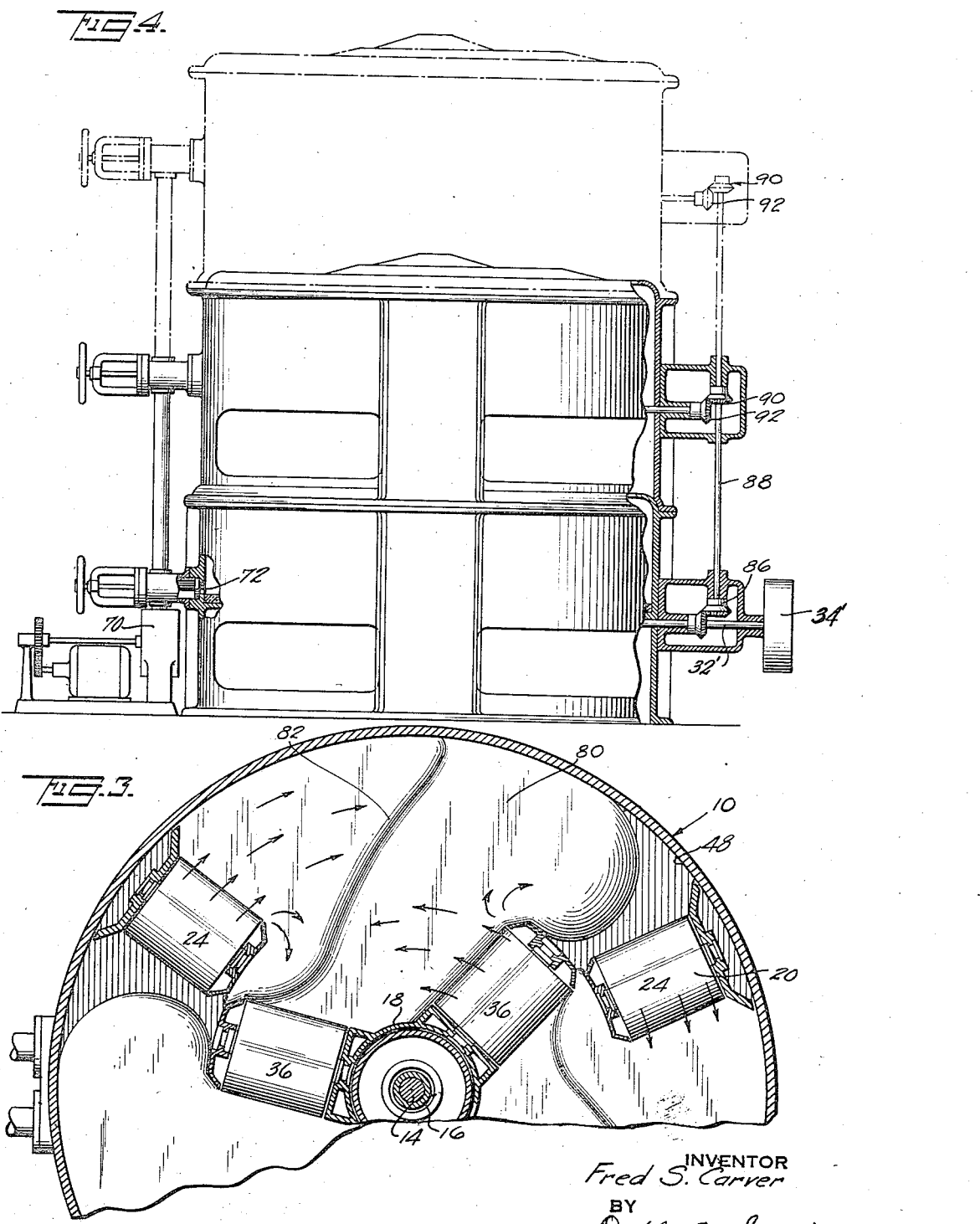

March 31, 1936.　　　F. S. CARVER　　　2,035,863
MACHINE FOR FINISHING CHOCOLATE AND THE LIKE
Filed May 27, 1930　　　3 Sheets-Sheet 3
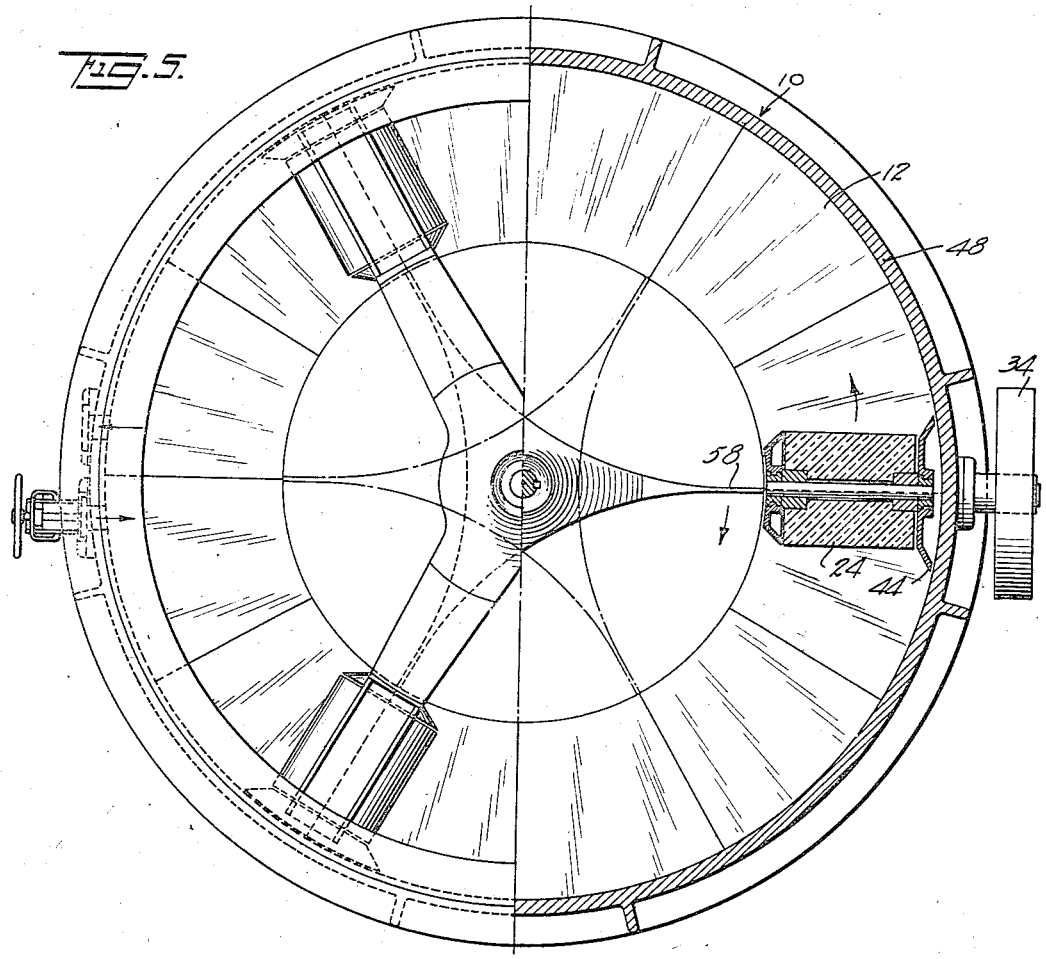
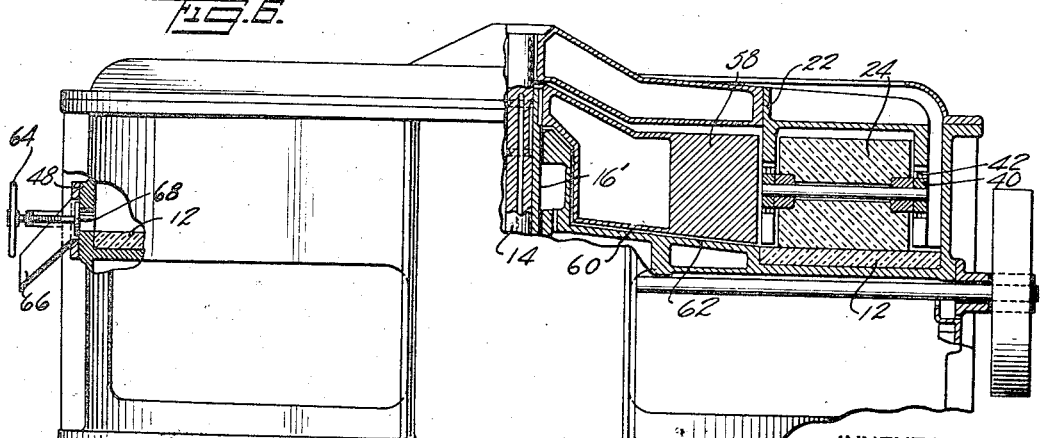
INVENTOR
Fred S. Carver
BY
Dyke and Schaines
ATTORNEYS Patented Mar. 31, 1936

2,035,863

UNITED STATES PATENT OFFICE 2,035,863

MACHINE FOR FINISHING CHOCOLATE AND THE LIKE

Fred S. Carver, East Orange, N. J.

Application May 27, 1930, Serial No. 456,136

19 Claims. (Cl. 83—45)

My invention relates to machines for finishing or working material such as chocolate to develop its fineness and texture. While the invention is not so limited, I shall describe here its application to finishing chocolate.

Chocolate is most acceptable when the blend of ingredients comprising chocolate liquor, cocoa butter, sugar, etc., is reduced to a state of great fineness, smooth texture, uniform flavor, and thorough homogeneity. Conch or finishing machines are now used to reduce the chocolate to such state.

The main objects of conching or finishing are to knead or work the chocolate and at the same time to effect its grinding, aeration and blending.

In the conch machines now in common use, the chocolate is alternately pushed back and forth from end to end of rectangular pans by reciprocating rollers. These pans are usually arranged in sets of four, their granite rollers—one to each pan—being driven by a connecting rod from a common crankshaft. The reciprocating motion of the rollers is accompanied by a reversal in direction of rotation at each end of the stroke. The reciprocating rollers work, knead and roll the chocolate, and rub and grind it to some extent when the motion of the rollers is reversed at the ends of the stroke. The chocolate is aerated by surface exposure to the air dissipating undesirable volatile matter, and the whole finally blended into a uniform, homogeneous mass. This is a slow and expensive operation, requiring about forty-eight to one hundred and twenty hours for its completion, but is the accepted practice in the most modern chocolate factories. The requirements of factory space for this kind of machinery, also the capital and operating expense involved, are very great.

Numerous attempts have been made to get results such as described with rotary machines, as for instance, the edge runner, melange, or chaser type of machine in which a single set of stones with plows or the like revolve in a circular pan or bed, and also with other rotary machines especially gotten up for this purpose. These, however, have failed due, principally, to the relation between the rotating parts not being such as to produce the effects obtained as above described with the reciprocating conch machine.

It is an object of the present invention to provide a machine which is adapted for more effective finishing of the chocolate, which is rotary and continuous in its operation, is simple and relatively inexpensive, and greatly reduces the time required for finishing treatment, with great reduction in investment, space required, power, and maintenance.

With the rotary machine of my invention, the parts operate by continuous rotary motion and are disposed in such relation to each other as to produce intermittent movement of portions of the chocolate in, toward, and out away from the machine axis, and to continually form or set up, break and reverse waves of chocolate as the parts revolve. With my new invention I get the same combination of desired effects upon the chocolate as with the present reciprocating conch, but more rapidly and completely.

In the preferred form of apparatus in accordance with my invention, the chocolate is worked by inner and outer impeller members revolving in opposite directions in a stationary circular pan. These impeller members are preferably constructed as a series of rollers carried on spiders driven from a central axis. Other relations between the three elemental members (the two impeller members and the pan) may be resorted to, so long as one of the three members is stationary and the others revolve with respect thereto and to one another, either in opposite directions, which is preferable, or in the same direction at different speeds.

Other objects of the invention will appear in connection with the description of the embodiment shown in the accompanying drawings, in which Fig. 1 is a part plan and part horizontal sectional view of an apparatus in accordance with my invention, making use of two sets of roller impelling members.

Fig. 3 is a part plan and part horizontal sectional view showing the manner in which the pasty material is kneaded or worked upon itself.

Fig. 4 is a part side and part vertical sectional view illustrating the superposing upon one another of two or more conches in accordance with my invention.

Fig. 5 is a view similar to Fig. 1 of a modified form of apparatus in which one of the impelling members utilizes rollers and the other impeller member is equipped with blades, though both impeller members may be of the blade type if desired.

Fig. 6 is a view similar to Fig. 2 of the apparatus shown in Fig. 5.

Figure 1:
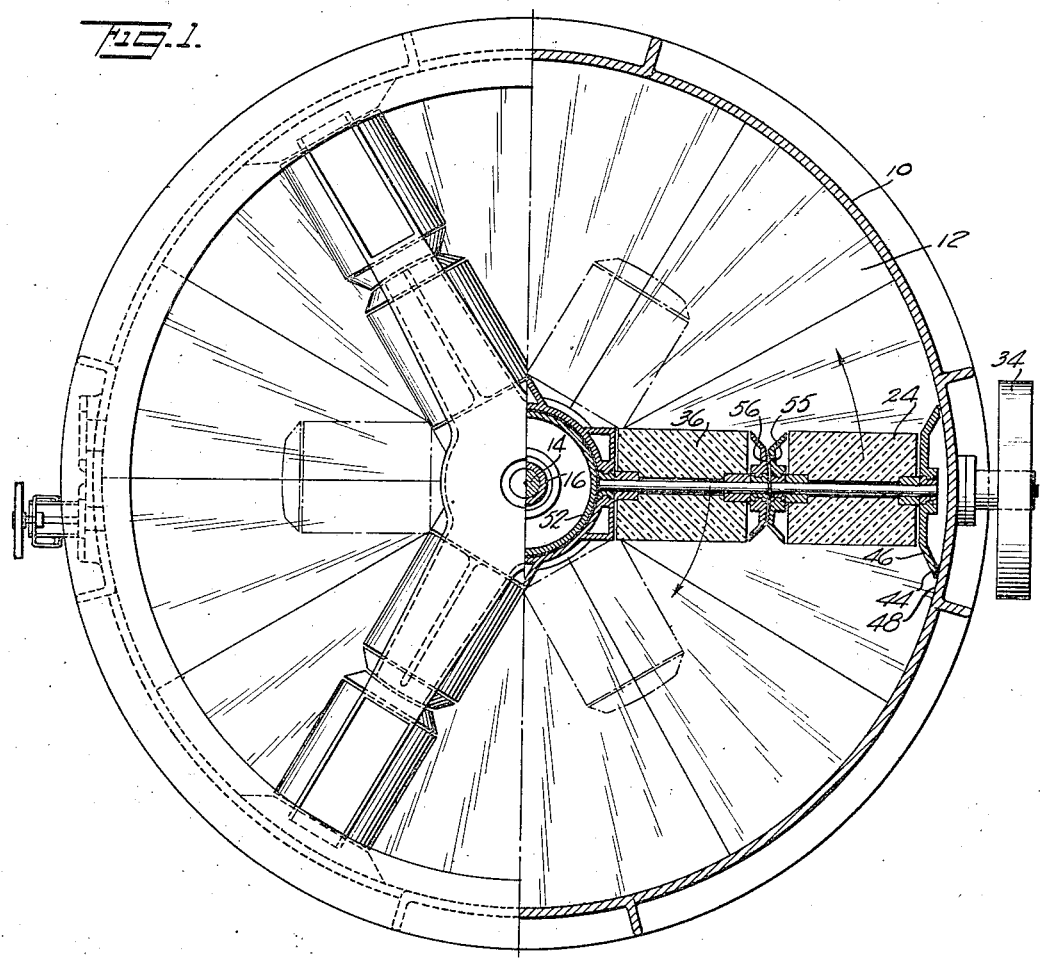
Figure 2:
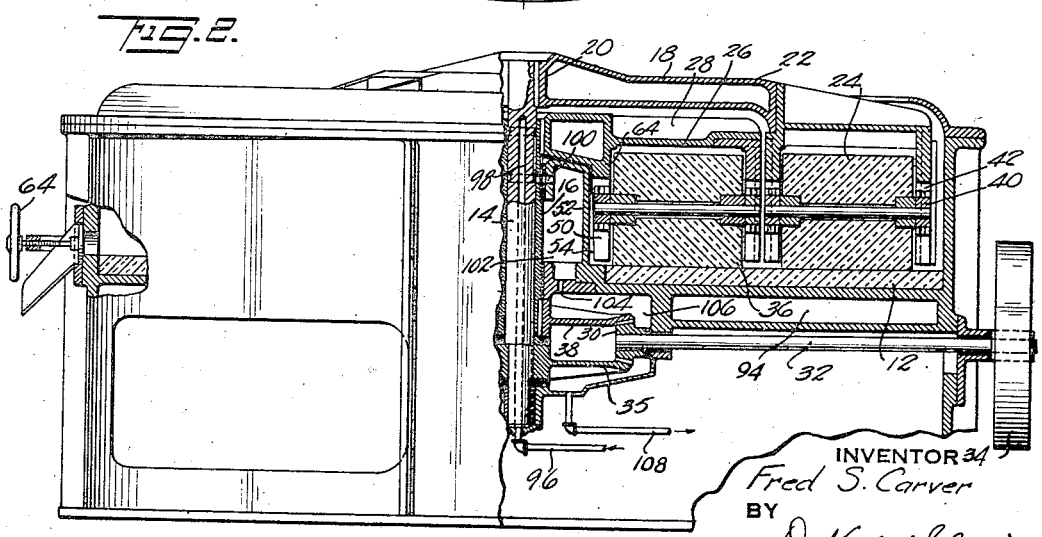
Fig. 2 is a part side view and part vertical sectional view of the apparatus shown in Fig. 1.

The circular pan 10 is here shown as being stationary, though it may be rotatable if desired. Its bottom liner 12 is preferably granite. As shown in Figures 4 and 6 the device comprises a plurality of superposed units, each unit comprising a generally vertical and cylindrical wall and a generally horizontal floor across intermediate the ends of said cylinder.

The revolving impeller members are driven by the vertical shaft 14 and sleeve shaft 16. The shaft 14 rotates the spider 18 of the outer impeller member comprising a central hub 20 and radial arms 22, which arms 22, preferably three in number, have journalled therein the outer impelling rollers 24 which are preferably plain cylindrical granite rollers and run on the outer portion of the granite liner 12, by which their weight is supported.

The inner impeller member, driven by the shaft 16, comprises the spider 26 having relatively short arms 28, also preferably three in number, which are shorter than the roller-carrying arms 22 of the outer impeller member, and have journalled therein the inner rollers 36 which work inside the outer rollers 24 and are also, preferably, plain cylindrical granite rollers.

Shafts 14 and 16 and the parts carried thereby are revolved in opposite directions by the bevel pinions 30 on drive shaft 32, which is supplied with a pulley wheel 34, said bevel pinion 30 meshing with teeth on the upper side of gear 35 on shaft 14 and also meshing with teeth on the under side of gear 38 secured to the sleeve 16.

The journalling arrangement of the rollers on their arms is such as to permit the rollers to be supported upon the bottom liner of the pan and to produce a close fit between the ends of rollers and the confining walls and also to leave a minimum clearance between the ends of the inner and outer rollers, respectively, as they pass by one another running in opposite directions. In the form shown, the bearing blocks 40 for the rollers float in downwardly opening slots 42 in which they are guided by a tongue and groove arrangement or equivalent, and the lips 44 of the depending outer portion 46 of arm 22 fit closely within the outer pan wall 48 and are shaped to throw any chocolate adhering to wall 48 in front of the rollers, while the inner depending portion 50 of the inner spider 26 has a substantially close fit against the inner pan wall or hub 52 with, however, a taper clearance at 54 adapted to prevent any tendency of the chocolate to creep up wall 52.

The downwardly extending concave inner portion 55 of the outer arms 22 and the downwardly extending outer convex portion 56 of the inner arm 28 enable these arms and the rollers to pass one another closely, moving in opposite directions.

The number of arms may be varied, sets of three being shown for purposes of illustration.

In the modified form of Figs. 5 and 6, the inner impeller member, which is driven by the outer sleeve 16 is provided with impeller blades 58, instead of rollers, and when such inner impeller blades are used instead of rotating rollers os similar arrangement, the inner portion of the preferably granite liner can be dispensed with and the impeller blade be supported by the driving sleeve 16' above the bottom of pan 10 so as to leave a slight clearance as indicated at 60, but not sufficient to permit passage therethrough of any considerable amount of chocolate. Also, where the impeller blades 58 are used, the floor of the pan thereunder is preferably inclined downwardly as at 62 toward the circumference of the pan to assist in throwing portions of the chocolate into the path of the outer rollers, and forcing such portions from ahead of the advancing outer rollers back against the outer rollers as they advance.

The valve 64 and outlet spout 66 may be provided for ready discharge of the material after same has been sufficiently worked; the outlet passage 66 controlled by valve 68 being preferably located in the outer wall 48 of the pan and immediately adjacent to the bottom liner 12.

The supply of material may be renewed when desired by means of pump 70, its distribution being controlled by valves 72.

In Fig. 3 I have indicated how the chocolate is kneaded or worked upon itself. Its consistency is such that while parts of it may be moved along bodily in case resistance to movement is sufficiently small, with increased resistance to its movement it flows in substantially the way that a liquid does, but has, of course, much higher viscosity and greater resistance to flowing action than ordinary liquids.

In the showing depicted in Fig. 3, with the inner rollers 36 moving counterclockwise, and the outer rollers 24 moving in a clockwise direction, the inner rollers 36 push along ahead of them and outwardly a portion of the chocolate which I have indicated at 80, whereas the outer rollers 24 push ahead of them in the opposite direction and somewhat inwardly a chocolate mass 82, this movement being indicated by the arrows in Fig. 3, and as the inner rollers 36 successively approach and pass the outer rollers 24, it will be apparent that the masses 80 and 82 oppose one another and are broken up by being pushed or worked against one another, and this action is repeated as the impeller members continue to revolve in opposite directions, the inner and outer rollers respectively pushing the material into the path of the rollers of the other set respectively, and this material being worked against itself and the waves broken up and reversed as the rollers repeatedly pass one another.

With three sets of rollers on the inner arms and three sets of rollers on the outer arms, both sets of arms being rotated at the same number of revolutions per minute, there are eighteen, twice the square of three, meetings and passings of the adjacent ends of inner and outer rollers for each complete revolution, and, of course, the same number of repetitions of the kneading action diagrammatically depicted in Fig. 3.

In the travel of the plain cylindrical rollers on their bed, the surface of the rollers at about the center thereof has a substantially true rolling motion. This is, however, not the case with the ends of the rollers, but the inner ends will run ahead and the outer ends will drag behind and thus depart from a true rolling movement and produce both a grinding and a rolling action of the pasty material between the bottom of the rollers and the pan bed or liners.

The parts of material thus ground between the rollers and the bed become incorporated into and kneaded with the masses 80 and 82 into a state of great fineness, smoothness and homogeneity.

To still further conserve factory space, two or more of my units may be superposed one upon another as indicated in Fig. 4. In such case all the impellers of the superposed units may be driven from a single drive shaft 32' and drive pulley 34', the drive being transmitted by the bevel gear 86, shaft 88 and sets of gears 90, 92, to as many of the conches as are arranged one upon another.

The pan 10 may be made with an under heating chamber 94 to which hot water or steam can be supplied for tempering the chocolate.

Lubrication can be effected by circulation through the supply pipe 96, through the bore 98 in shaft 14, through intermittently registering ports 100 into the chambered part 102 behind the inner pan wall 52, downward through passages 104 into the gear box chamber 106 and thence through the exit pipe 108 to a circulating pump (not shown), from which it can be returned to the inlet pipe 96.

I claim:

1. In apparatus for working pasty material such as chocolate, a circular pan with an outer wall, a floor and a hub, inner and outer impeller members rotatable on an axis at the center of the pan, inner and outer bearing members extending downwardly from the inner impeller member, the inner bearing member thereof arranged with substantially only a working clearance from the hub, inner and outer bearing members on the outer impeller member, the outer bearing member thereof with substantially only working clearance distance from the pan wall and the inner one thereof adapted when the impeller members pass one another to have substantially only a passing clearance from the outer bearing member on the inner impeller member, and rollers mounted in grooves in said bearing members and adapted to rotate therewith and to be supported on the pan floors as they travel.

2. In apparatus for working pasty material such as chocolate, a pan member with a circular outer wall and a floor, inner impeller means arranged to rotate about an axis at the center of the floor and wall and to sweep over and closely fit the floor, and outer impeller means arranged to rotate about the same axis and sweep over and closely fit the part of the floor between the inner impeller means and the outer wall, both of said impeller means being without any substantial apertures, whereby material cannot slip through them, there being only working clearance between the outer impeller means and the outer wall, and between the outer impeller and the inner impeller, and the inner impeller at its inner end fitting the pan structure with substantially only working clearance right up to the common axis and two of the three elements, i. e. pan and impeller means, revoluble on an axis common to all three thereof, whereby at relative passings of said impeller means portions of the pasty material ahead of and projecting outwardly beyond the inner impeller means and portions of the pasty material ahead of and projecting inwardly beyond the outer impelling means, are squeezed into each other and sheared.

3. Apparatus as in claim 2, in which the pan has a circular inner wall, and the inner ends of the inner impeller means fit the inner wall with substantially only working clearance.

4. Apparatus as in claim 2, in which the pan is stationary and the impeller means revolve in opposite directions.

5. Apparatus as in claim 2, in which the pan is stationary and the inner and outer impeller means each comprise more than two radial arms, and such inner and outer impeller means revolve in opposite directions.

6. Apparatus as in claim 2, in which the pan has a circular inner wall and the inner ends of the inner impeller means fit the inner wall with substantially only working clearance and the pan is stationary and the impeller means revolve in opposite directions.

7. Apparatus as in claim 2, in which the impeller means are roller arms of substantial thickness and the relatively passing parts thereof are formed as substantially arcs of circles centered at the common axis.

8. Apparatus as in claim 2, in which the pan is stationary and the impeller means revolve in opposite directions and the impeller means are roller arms of substantial thickness and the relatively passing parts thereof are formed substantially as arcs of circles centered at the common axis.

9. In apparatus for working pasty material such as chocolate, a substantially flat floor, a plurality of coaxial rotors sweeping the surface of said floor and mounted thereon for rotation with respect to each other and the floor, a hub on the floor providing an inner wall about the axis of the rotors, a substantially vertical circular outer wall around the floor, the length and disposition of the rotors being such that as they pass each other they form a substantially completely closed dam from the hub to the outer wall.

10. The device of claim 9 in which the floor and wall are stationary.

11. The device of claim 9 in which certain of the rotors revolve in opposite directions.

12. The device of claim 9 in which the floor and wall are stationary and certain of the rotors revolve in opposite directions.

13. The device of claim 9 in which the rotors consist of one inner set adjacent the hub and one outer set adjacent the outer wall.

14. The device of claim 9 in which the rotors bear rollers which roll on the pan floor.

15. The device of claim 9 in which the rotors bear rollers which roll on the pan floor, each arm of said rotors having a bearing at each end of its roller, said bearings filling the radial space between the hub and the adjacent roller, the wall and the adjacent roller, and between the rollers.

16. A device for reducing a pasty mass to more complete homogeneity comprising a stationary circular flat bottom pan having a substantially vertical edge wall, a plurality of radially extending circumferentially spaced outer rollers arranged to revolve on the floor of said pan about the center thereof, said rollers extending close to the side wall, a hub in the center of said pan, a plurality of radially extending inner rollers arranged to revolve about the same axis in the opposite direction, their length being substantially the distance from said hub to the inner end of the outer roller structure.

17. A device for reducing a pasty mass to more complete homogeneity comprising a circular bed having a generally vertical surrounding wall and a central hub, a first arm mounted for rotary movement with respect to said pan about the axis of said pan, a first roller mounted on said arm for rotary movement about its own axis, said first roller running on the floor of the pan, a second arm mounted for rotary movement with respect to said pan and first arm about the axis of said pan, a second roller mounted on said second arm for rotary movement about its own axis, said second roller running on the floor of the pan, said first arm and roller structure running within the pan close to its outer wall and extending without any substantial opening to closely fit the pan wall, said second arm and roller structure running within the pan close to its hub and extending without any substantial opening to closely fit the hub, the outer end of the second roller structure being convex, the inner end of the first roller structure being concave, their lengths being such that they just clear each other, and the radius of curvature of their ends being the same as the radius from their common axis to their point of meeting.

18. A device for reducing a pasty mass to more complete homogeneity comprising a generally level circular bed having a central hub, a retaining wall around said bed, an inner set and an outer set of impellers mounted within the wall concentric with the bed and positioned thereon about said central hub, with bottom edges shaped to conform closely to the bottom of the pan for their whole length, the bed and the two sets of impellers constructed for each to move relative to both of the others about their common axis, the length of the outer impellers plus the length of the inner impellers being substantially equal to the distance between the hub and the wall.

19. A device for working chocolate and the like comprising a plurality of superposed units, each unit comprising a generally vertical and cylindrical wall, a generally horizontal floor across intermediate the ends of said cylinder, a plurality of inner and outer impellers arranged to rotate on said floor and within the upper cylindrical compartment, a shaft for each impeller extending vertically through the floor at the center thereof, the shaft for each inner impeller being a sleeve surrounding the central shaft for the outermost impeller, a unit drive shaft extending through the cylindrical wall and in the lower part under the floor and being so connected as to drive all the impeller shafts and not all in the same direction, said units fitting on top of each other so as to encase their adjacent compartments, and a common drive shaft connecting all the unit drive shafts for simultaneous operation from a common power source.

FRED S. CARVER.